United States Patent [19]

Wheeler

[11] Patent Number: 4,954,716
[45] Date of Patent: Sep. 4, 1990

[54] PACKAGE AND SUPPORT STRUCTURE FOR RADIATION DETECTOR

[75] Inventor: Robert V. Wheeler, Lemont, Ill.

[73] Assignee: Tech/Ops Landauer, Inc., Glenwood, Ill.

[21] Appl. No.: 218,640

[22] Filed: Jul. 13, 1988

[51] Int. Cl.$^5$ .......................... G03B 42/00; G01T 1/04
[52] U.S. Cl. .............................. 250/482.1; 250/475.2; 250/472.1
[58] Field of Search ............... 250/472.1, 473.1, 475.2, 250/482.1, 492.1

[56] References Cited

U.S. PATENT DOCUMENTS

| | | | |
|---|---|---|---|
| 3,567,933 | 3/1971 | Prest | 250/482.1 |
| 3,665,194 | 5/1972 | Alter et al. | 250/253 |
| 4,338,523 | 7/1982 | Alter | 250/473.1 |
| 4,518,860 | 5/1985 | Alter et al. | 250/472.1 |
| 4,847,494 | 7/1989 | Alvarez | 250/253 |

Primary Examiner—Constantine Hannaher
Assistant Examiner—J. Eisenberg
Attorney, Agent, or Firm—Richard Bushnell

[57] ABSTRACT

A package for shielded handling of a detector element and for selective exposure of said detector element to radiation, typically in radon detection of emitted alpha particle radiation, is provided in a unitary assembly. The package provides a support structure for securement of a detector member within the package and includes a shielding structure for selective insulation of the detector member in a shielding position of the support structure to prevent background irradiation of the detector member during handling and transport to and from the irradiation monitoring location. The package provides selective exposure of the detector element to irradiation in an exposing position of the support structure at the monitoring location. The package is provided with transport structure for relatively moving the support structure with the detector member so that the detector member can be selectively displaced between shielding and exposing positions. The package thus accommodates both convenient transport and monitoring exposure of the detector member without requiring the monitoring user to employ additional equipment. The package can be erected from a unitary blank of foldable material such as die-cut paperboard, and includes a self-supporting base structure for supporting the package in a standing configuration which exposes the detector member during radiation monitoring.

20 Claims, 3 Drawing Sheets

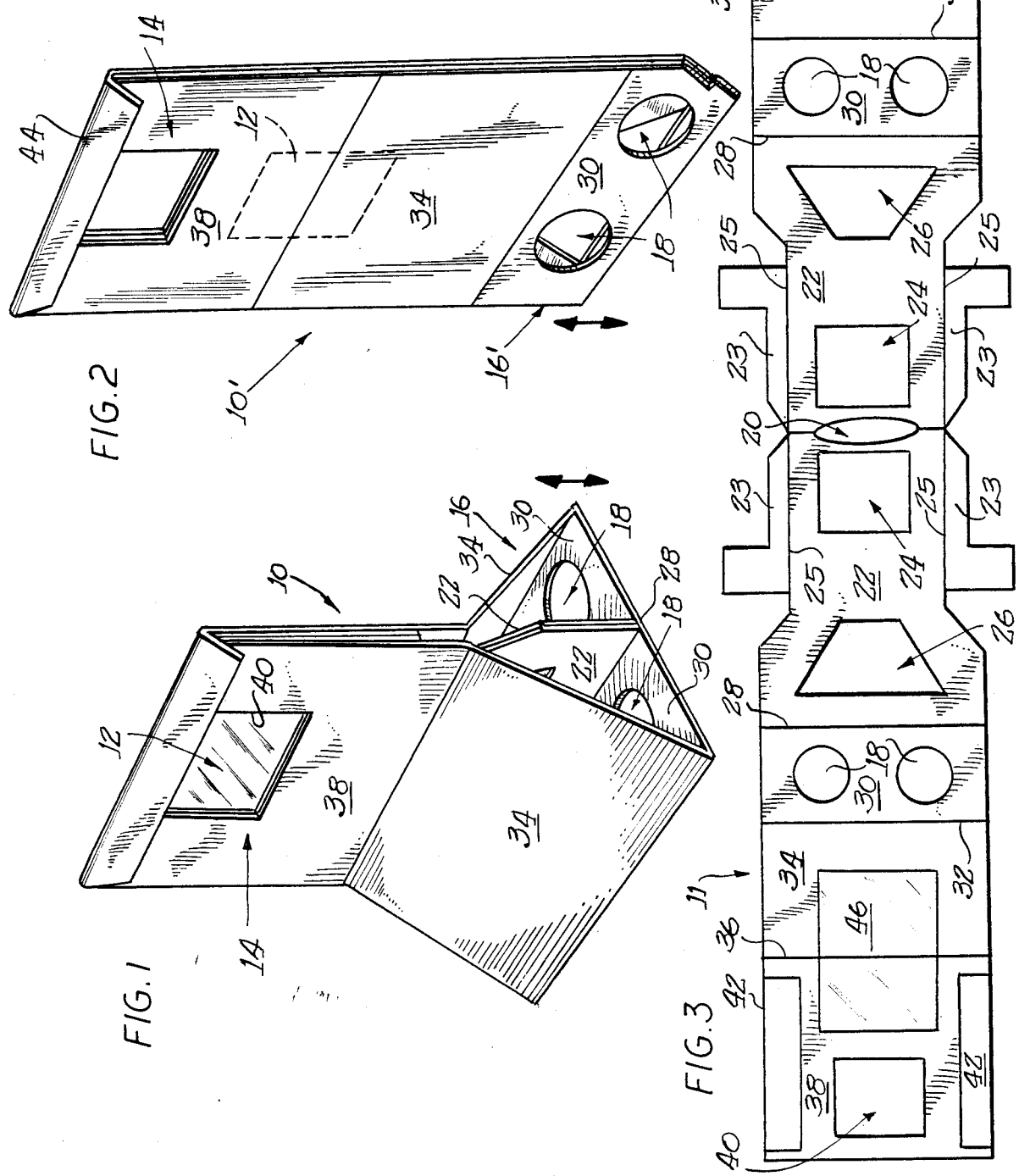

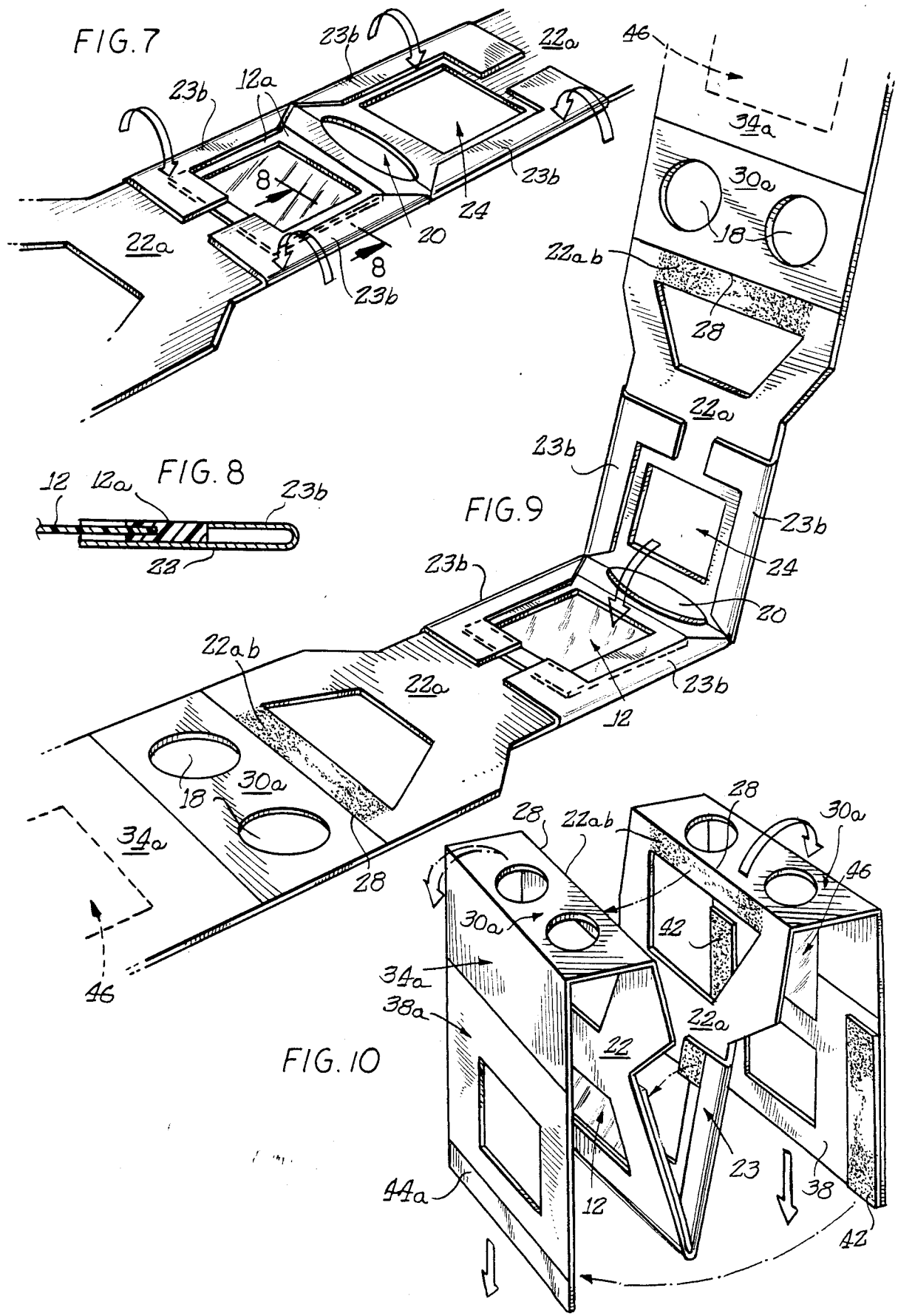

PACKAGE AND SUPPORT STRUCTURE FOR RADIATION DETECTOR

BACKGROUND OF THE INVENTION

This invention relates to radiation detectors such as those used in detection of radon gas which record the impact of alpha particles. More particularly, this invention relates to packaging for such detectors during handling and irradiation exposure.

As described, for example, in U.S. Pat. No. 3,665,194 (Alter et al, 1972) devices for detection of radon gas have been developed in which the radon gas is detected by exposure of a film of detector material coated on one face of a conventional glass microscope slide or in the form of a separate sheet of material which is cemented or secured to a base plate. The detector material is exposed to irradiation by alpha particles emitted by radon gas and the detector material has the property of forming damage tracks along paths traversed by the alpha particles. After exposure, the material is etched with a reagent to enlarge the tracks for convenient counting. Typically, the detector is exposed only at the location for which a radiation monitor is to be evaluated in order to avoid "background" irradiation not associated with that location. Consequently, the detector material must be shielded from irradiation during handling and transport to the location to be monitored, and similarly shielded following the monitoring exposure, particularly when subsequent processing such as track etching is performed at a different site to which the detector must be again transported.

SUMMARY OF THE INVENTION

In accordance with this invention, a package for shielded handling of a detector element and for selective exposure of said detector element to radiation, typically in radon detection of emitted alpha particle radiation, is provided in a unitary assembly. The package provides a support structure for securement of a detector member within the package and includes a shielding structure for selective insulation of the detector member in a shielding position of the support structure to prevent background irradiation of the detector member during handling and transport to and from the irradiation monitoring location. The package provides selective exposure of the detector element to irradiation in an exposing position of the support structure at the monitoring location. The package is provided with transport structure for relatively moving the support structure with the detector member in relation to the shielding and exposure structures so that the detector member can be selectively displaced between shielding and exposing positions. The package thus accommodates both convenient transport and monitoring exposure of the detector member without requiring the monitoring user to employ additional equipment.

In a preferred embodiment, the package is erected from a unitary blank of foldable material such as die-cut paperboard. The erected package can include a self-supporting base structure for supporting the package in a standing configuration which exposes the detector member during radiation monitoring, typically for radon detection. Particularly in radon detection applications, the base structure supports the package so that the detector member is spaced at least three inches from adjacent vertical surfaces to ensure that radon daughter products which have deposited on the adjacent vertical surfaces will emit alpha particles which will be sufficiently energy degraded after traversing three inches of air that the alpha particles will not be capable of registration upon the detector member. Thus spaced the detector will register substantially only alpha particles emitted by gaseous and aerosol sources, primarily radon. Shielding materials such as aluminum foil impenetrable to alpha particles can be mounted upon the unitary blank in order to provide the shielding structure for the detector member in the erected package.

BRIEF DESCRIPTION OF THE DRAWING

FIG. 1 is a perspective view of one embodiment of the package in accordance with the invention, showing the package in a self-supporting configuration for irradiation monitoring by a detector member supported in an exposure position within the package;

FIG. 2 is a perspective of the package of FIG. 1 shown in a collapsed configuration which shields the detector member for handling and transport of the package;

FIG. 3 is a top plan view of a unitary blank of foldable material which can be erected into the package of FIGS. 1 and 2.

FIG. 7 is a fragmentary, perspective view of the blank similar to FIG. 6 showing the folding of flaps of the blank to secure the framed detector member.

FIG. 8 is a sectional view taken along line 8—8 in FIG. 7, viewed in the indicated direction;

FIG. 9 is a fragmentary, perspective view similar to FIGS. 7 and 8 showing the initial folding to erect the package; and FIG. 10 is a perspective view of the intermediate folding of the unitary blank prior t complete erection of the package into the configuration shown in FIG. 2.

DETAILED DESCRIPTION OF THE ILLUSTRATED EMBODIMENT

Figure 4:
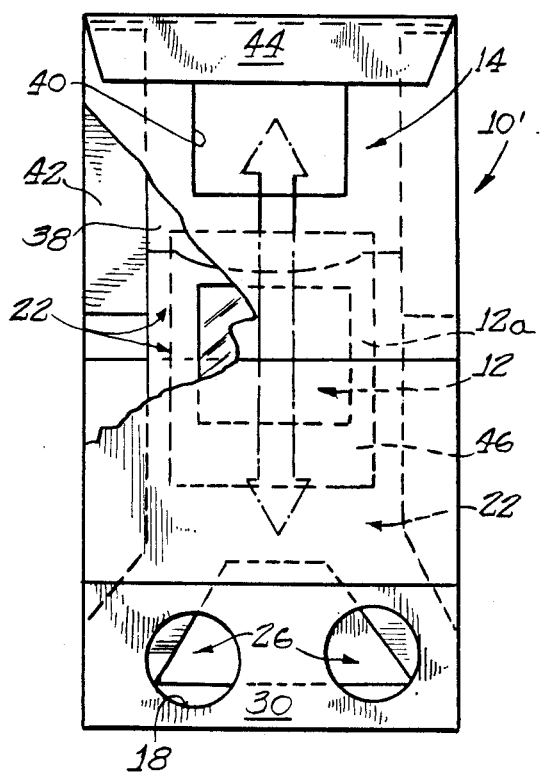
FIG. 4 is a side view of the package configuration of FIG. 2.

Referring to FIG. 1, an embodiment of a package in accordance with the invention, generally designated by reference character 10, is shown in the upright configuration which is employed to orient the detector member 12 in the exposed position for irradiation monitoring, for example, radon detection. In this embodiment, the detector 12 is a double-sided film of detector material with a supporting frame dimensioned for a 35 mm slide as more fully described in the commonly assigned and copending U.S. patent application Ser. No. 211,516 entitled Improved Detector For Radon. In the configuration shown in FIG. 1, the double-sided detector 12 is exposed at a window structure 14 from which the detector 12 is reversibly withdrawn into a concealed, or shielded position within the package 10 as shown in FIGS. 2 and 4. The withdrawal of the detector member 12 from the window structure 14 downwardly into the shielded position is conveniently manipulated by collapsing the triangularly-shaped support base portion 16 of the package 10 into the generally planar configuration 16' of the extended planar package configuration 10' as shown in FIGS. 2 and 4. The reversible conversion of the package between the exposure configuration 10 in FIGS. 1 and 5 and the shielding configuration 10' also displaces the support structure for the detector member 12 as further described hereinafter. This manual displacement is facilitated by the manual gripping apertures 18.

In a preferred embodiment, the composite convertible package 10, 10' can be erected from a single piece blank 11, as shown in FIG. 3. The unitary blank 11 can be stamped or die cut from a web of paperboard or similar generally rigid but foldable material.

The blank 11 is fabricated in symmetrical configuration equally divided by the central cutout 20. Except as noted in reference to a cutout or aperture, all of the internal lines within the blank 11 are score lines adapted for folding the blank to erect the package 10, 10'. In erecting the package 10, 10, from the blank 11 the corresponding, mirror-image panels in each half of the blank are folded into abutment to construct four interconnected functional structures of the package. The two centrally adjoining support panels 22 with respective rectangular apertures 24 are folded together as described with reference to FIG. 7 to form the apertured support structure surrounding and securing the framed detector 12, and are also linearly displaceable to carry the detector 12 during conversion between the package configurations 10 and 10'. The respective cutouts 26 are provided in the support panels 22 in order to enhance gripping of the joined support panels 22 which are accessible to the user's fingers projecting through the apertures 18, particularly in the package configuration 10 when pulling the support panels 22 downwardly to convert to the package configuration 10' for shielding the detector 12 therewithin.

Figure 6:
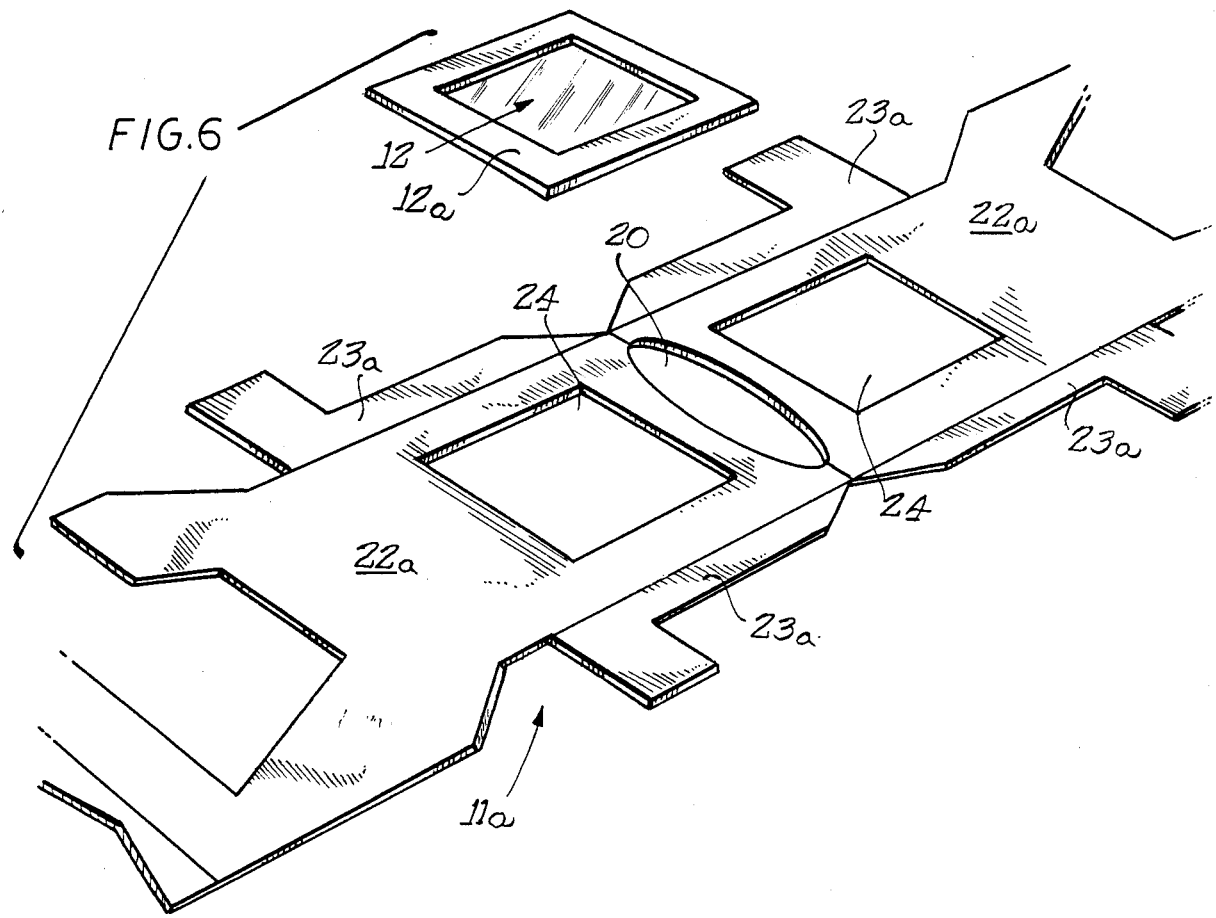
FIG. 6 is a fragmentary perspective view of a portion of the unitary blank shown in FIG. 3 which secures the framed detector member within the package.

As shown in FIGS. 3 and 6, each of the support panels 22 has a pair of L-shaped side flaps 23 laterally extending and integrally hinged along opposite side edges at respective score lines 25. As shown in FIGS. 6-9, the flaps 23 are folded to clamp the frame 12a on the detector member 12 against one of the support panels 22 which is then folded against the other support panel 22 to form an encasing support structure for the framed detector member 12.

The support panels 22 are integrally hinged by score line 28 to respective floor panels 30 with the gripping apertures 18. As shown in FIG. 1, the apertured floor panels 30 are aligned edge to edge to form a floor for the support base 16 of the standing package configuration 10 which exposes the detector member 12. Particularly in radon detection, each of the floor panels 30 should be at least about three inches in width so that they will space the detector member 12 the same minimum three inch distance from any vertical surface such as an adjacent wall;

Alpha particles sufficiently degraded in energy after traversing three inches of air that these alpha particles will not be capable of registration upon the detector member 12.

To convert the package configuration 10 to the package configuration 10' in FIG. 2, the floor panels 30 are rotated about the score lines 28, downwardly toward each other until they are abutted back to back in the planar configuration of the package 10'.

Figure 5:
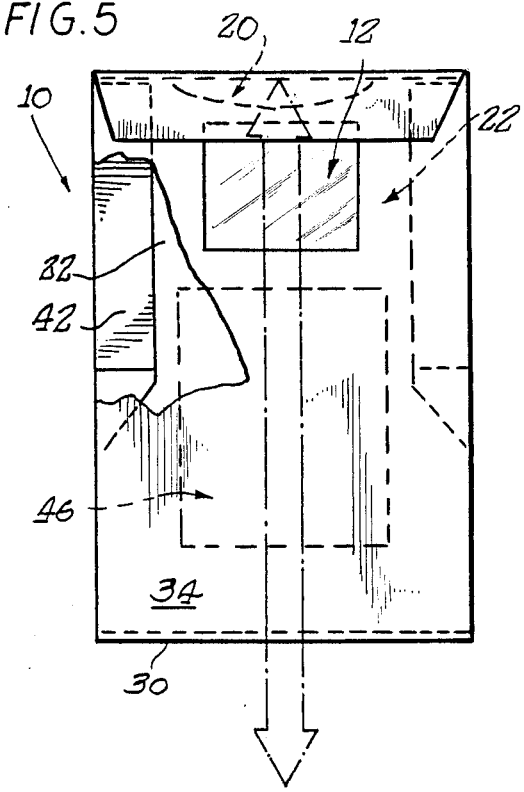
FIG. 5 is a side view of the package configuration shown in FIG. 1.

Each of the floor panels 30 is integrally hinged at a score line 32 to a respective base panel 34; the base panels 34 form the angled walls of the triangularly-shaped base structure 16 in the package configuration 10 as shown in FIG. 1. Each of the base panels 34 is integrally hinged at score line 36 to a respective window panel 38. Each of the window panels 38 includes a window aperture 40 at which the detector member 12 is exposed in the package configuration 10 shown in FIGS. 1 and 5. Each of the window panels 38 also includes a pair of affixed spacer members 42 which can be merely additional plies of glued paperboard. The spacer members 42 are aligned along opposing lateral edges of the respective window panels and are sufficiently spaced to allow the support structure of the joined support panels 22 to slide between the spacer members 42 as shown in FIGS. 4 and 5 in reversibly converting package configurations 10 and 10'.

In the embodiment of the blank 11 as shown in FIG. 3, the window panel 38 shown on the right also has a hinged end flap 44; as shown in FIGS. 2 and 10, the end flap 44 receives glue application and is folded over and joined to the other window flap 38 to complete a manufacturer's joint in erecting the package configuration 10' shown in FIG. 2. The spacer panels 42 immediately adjacent to the end flap 44 can also have glue applied for joining to the oppositely aligned spacer panels 42 on the other window panel 38.

In order to provide a concealed, shielding structure within the package 10, 10' a sheet or foil of barrier material 46, for example, aluminum foil or similar material which is impenetrable to the radiation to be monitored, is mounted with adhesive at a location generally adjacent to but spaced from, each of the respective windows 40. When the framed detector member 12 is withdrawn from the congruent monitoring windows 14 the detector member can be readily displaced into the location between the two barrier materials 46 as shown in FIG. 4 to shield the covered detector material 12 from radiation extraneous to the radiation to be monitored when the detector member is exposed in the window structure 14, as shown in FIGS. 1 and 5. To convert between the package configurations 10 and 10' the joined supporting panels 22 are entirely displaced as indicated by the large arrows in FIGS. 4 and 5, to transport the framed detector member 12 between the shielding position flanked by the barrier materials 46 and the exposure position at the windows 40.

When the fully extended blank 11 as shown in FIG. 3, is to be erected, the blank 11 is first turned entirely upside down to expose the back side 11a, and the reverse surfaces of the individual panels are designated by addition of "a" to the respective reference numerals as shown in FIG. 6. The framed detector member 12 is superimposed on the rectangular aperture 24 shown on the left in FIG. 6. Thereafter, as shown in FIG. 7, the flaps 23 are folded inwardly to overlap the detector member frame 12a, substantially without obstructing the detector member 12; the pair of flaps 23 shown on the right in FIG. 7 are similarly folded inwardly to directly engage their respectively hinged support panel surface 22a. In the preferred embodiment shown in FIGS. 7 and 8, the longer legs 23b of the L-shaped flaps 23 adjacently abut the opposing, lateral edges of the detector member frame 12a in order to secure the anchored positioning of the detector member 12 aligned with the apertures 24.

Referring now to FIG. 9, in order to complete the erection of the detector support structure, glue is applied to the flaps 23 and to the respective end portions 22ab after which the support panels 22 are folded together as indicated by the arrow in FIG. 9. This fold joins the two pairs of flaps 23 and the end panel portions 22ab which completes the support structure and securement of the detector member 12 therein.

Referring to FIG. 10, at the same time the support panels 22 are folded and glued together, both the window structure 14 and the support base configuration 16' (FIG. 2) are completed by folding and rotating both of the floor panels 30 about the respective score lines 28 backwardly and away from the joined support panels 22 so that the support structure then lies between the two expanses of the respective floor, base and window panels 30, 34 and 38 as shown in FIG. 10. Thereafter, the glued end flap 44 is folded over and joined to the opposite window panel 38 and the spacer members 42 are joined to compress and to complete the window structure 14 as shown in FIG. 2 wherein the package 10' is inverted with respect to the configuration in FIG. 10 in which the actual reverse panel surfaces are designated.

In light of the foregoing description of the embodied packaging of the invention, it will be evident to those skilled in packaging design that various aspects may be modified without departing from the invention. As such, the scope of the invention is not limited by the particular embodiment illustrated and described herein and is defined by the appended claims and equivalence thereof.

What is claimed is:

1. A package for shielded handling of detector element and for selective exposure of said detector element to irradiation such as in radon detection, said package comprising:
   (a) a support structure for securement of said detector within said package;
   (b) a shielding structure for selective insulation of said detector member from said radiation in a shielding position of said support structure;
   (c) an exposure structure for exposing said detector member to said irradiation or the like in an exposing position of said support structure, said exposure structure and said shielding structure being longitudinally separated for enabling said selective exposure; and
   (d) transport means carrying said support structure and detector member for longitudinally displacing said support structure and detector member between said shielding and exposure structures in order to selectively displace said detector member between said shielding and exposing positions of said support structure.

2. The package according to claim 1 wherein said support structure comprises anchoring means for securing a supporting frame in which said detector element is mounted.

3. The package according to claim 1 wherein said exposure structure includes an aperture within said package, said aperture located within the path of said motion of the detector member to enable selective exposure of the detector member through said aperture.

4. The package according to claim 3 wherein said transport means enables sliding movement of said support structure between said exposing position of the detector member at said aperture and said shielding position.

5. The package according to claim 1 in combination with a detector element including a film comprising material having the property of forming damage tracks along paths traversed by alpha particles.

6. The package according to claim 5 wherein said exposure structure provides simultaneous exposure of both opposite sides of said film.

7. The package according to claim 1 wherein said shielding structure comprises shielding material impenetrable to alpha particles.

8. The package according to claim 7 wherein said shielding material includes foil strips comprising aluminum.

9. The package according to claim 1 further comprising a base structure enabling a self-supporting configuration of said package in said exposing position for irradiation of said detector member.

10. The package according to claim 9 wherein said base structure provides spacing of said detector member in said exposing position at least 3 inches from vertical surfaces adjacent to said package.

11. The package according to claim 1 wherein said package is fabricated from paperboard material.

12. The package according to claim 1 wherein said package is erected from a unitary blank of foldable material.

13. The package according to claim 12 wherein shielding material impenetrable to alpha particles is mounted upon said unitary blank for erection into said shielding structure of said package.

14. The package according to claim 1 wherein said transport means is formed integral with said package.

15. A package for shielded handling of an alpha particle detector element and for selective exposure of said detector element, comprising: a shielding structure including closely spaced opposite side portions preventing penetration of alpha particles therethrough, a transport slide carrying a detector element and moveable to and from a retracted position locating said detector element between said side portions and an extended position locating said detector element beyond said side portions for exposure to alpha particles, said side portions closely embracing said detector element in said retracted position for preventing the formation of alpha particle damage tracks thereon, and manually operable means connected with said transport slide for moving said transport slide between said extended and retracted positions.

16. The package according to claim 15 further comprising a base structure enabling a self-supporting configuration of said package in said extended position for irradiation of said detector member.

17. The package according to claim 16 wherein said base structure provides spacing of said detector member in said extended position at least 3 inches from vertical surfaces adjacent to said package.

18. The package according to claim 15 wherein said package is erected from a unitary blank of foldable material.

19. The package according to claim 18 wherein shielding material impenetrable to alpha particles is mounted upon said unitary blank for erection into said shielding structure of said package.

20. The package according to claim 15 wherein said transport slide is formed integral with said package.

* * * * *

UNITED STATES PATENT AND TRADEMARK OFFICE
CERTIFICATE OF CORRECTION

PATENT NO. : 4,954,716

DATED : September 4, 1990

INVENTOR(S) : Robert V. Wheeler

It is certified that error appears in the above-identified patent and that said Letters Patent is hereby corrected as shown below:

Column 2, Line 42 "prior t complete" it should be
-- prior to complete --

Column 3, Line 17 "package 10,10, from" it should be
-- package 10,10' from --

Signed and Sealed this

Eleventh Day of August, 1992

*Attest:*

DOUGLAS B. COMER

*Attesting Officer*      *Acting Commissioner of Patents and Trademarks*